US010126728B2

(12) United States Patent
Gozzi et al.

(10) Patent No.: US 10,126,728 B2
(45) Date of Patent: Nov. 13, 2018

(54) METHOD AND SYSTEM FOR COLLECTING VIA A MES SYSTEM TIME-STAMPS OF WORKING-STATUSES

(71) Applicant: SIEMENS AKTIENGESELLSCHAFT, Munich (DE)

(72) Inventors: Andrea Gozzi, Genoa (IT); Katia Lupi, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 453 days.

(21) Appl. No.: 14/860,946

(22) Filed: Sep. 22, 2015

(65) Prior Publication Data

US 2016/0085228 A1    Mar. 24, 2016

(30) Foreign Application Priority Data

Sep. 23, 2014  (EP) .................................. 14186031

(51) Int. Cl.
  *G06F 19/00*  (2018.01)
  *G05B 19/05*  (2006.01)
  *G06Q 10/06*  (2012.01)

(52) U.S. Cl.
  CPC ....... *G05B 19/058* (2013.01); *G06Q 10/0639* (2013.01); *G05B 2219/1178* (2013.01); *Y02P 80/40* (2015.11)

(58) Field of Classification Search
  None
  See application file for complete search history.

(56) References Cited

U.S. PATENT DOCUMENTS

| 7,339,476 B2 | 3/2008 | Macurek et al. |
| 9,116,907 B2 | 8/2015 | Olmino |
| 2005/0060048 A1* | 3/2005 | Pierre ..................... G06Q 10/06 700/28 |

FOREIGN PATENT DOCUMENTS

| CN | 1811637 A | 8/2006 |
| CN | 103595416 A | 2/2014 |
| EP | 2051197 A1 | 4/2009 |
| EP | 2237197 A1 | 10/2010 |
| WO | 2006053908 A1 | 5/2006 |

* cited by examiner

*Primary Examiner* — Cory Eskridge
(74) *Attorney, Agent, or Firm* — Laurence Greenberg; Werner Stemer; Ralph Locher

(57) ABSTRACT

A method and a system collect via a MES, time-stamps of working-statuses of machines and operators, called also actors, for a calculation of a time-dependant component of OLE and OEE indicators in a manufacturing task. The method includes providing a token for assigning to an actor the responsibility of data provision, and defining two meta-statuses for a machine in a task, called operating and booked meta-status respectively. Each meta-status groups a set of machine statuses. A machine is defined to be in an operating meta-status when the machine is in a status engaged in the task and it is able to know and notify its own status. A machine is defined to be in a booked meta-status when the machine is in a status engaged in the task and it is unable to notify its own status.

7 Claims, 2 Drawing Sheets

METHOD AND SYSTEM FOR COLLECTING VIA A MES SYSTEM TIME-STAMPS OF WORKING-STATUSES

CROSS-REFERENCE TO RELATED APPLICATION

This application claims the priority, under 35 U.S.C. § 119, of European application EP 14186031.2, filed Sep. 23, 2014; the prior application is herewith incorporated by reference in its entirety.

BACKGROUND OF THE INVENTION

Field of the Invention

The present invention relates to a method and to a system for collecting by a MES system time-stamps or time-logs of working-statuses according to the preamble of the independent claims.

In the world of industrial automation of today, in order to increase competitiveness, manufacturing companies need to simultaneously reduce time-to-market, increase process visibility and production flexibility, optimize forecasting and scheduling, and reduce scrap, stock levels and downtimes; all while ensuring optimal quality and production efficiency across all global facilities.

In order to meet these demanding goals, manufacturing companies require an integrated IT infrastructure that helps them in coordinating production on a global scale and, if necessary, in real time. The manufacturing execution system (MES) is generally known as the IT layer that integrates the business systems (e.g. ERP) and production control systems.

Siemens Corporation offers a broad range of MES products, under its SIMATIC® product family.

As defined by the Manufacturing Enterprise Solutions Association (MESA International), the MES system "is a dynamic information system that drives effective execution of manufacturing operations", by managing "production operations from point of order release into manufacturing to point of product delivery into finished goods" and by providing "mission critical information about production activities to others across the organization and supply chain via bi-directional communication." The international standard for developing MES systems is commonly referred as ISA-95 or S95.

Typically, at engineering time, system engineers flexibly customize MES applications according to the specific manufacturing plant requirements.

Instead, at runtime, MES applications are utilized by end-users who may be plant operators or line responsible personnel.

An important feature for MES applications in manufacturing control and automation is the calculation of key performance indicators (KPIs).

KPIs are metrics computed to quantify certain performances for a planned or an executed manufacturing production.

For example, a KPI may be the production rate of a given plant or of a give machine computed as the number of manufactured pieces in the time interval. Another example may be the idle time of certain plant machines in a production day.

Manufacturing companies are required to monitor and to improve the performance of their assets by focusing on both the manpower/labor efficiency and the machine/equipment efficiency.

Complex manufacturing procedures are usually a mix of manual and machine operations. The machines that are used in complex manufacturing provides highly automated capabilities during a task execution, however, they still may require some manual operations, before, during and after each task, for the preparation, supervision and maintenance of the machine.

In complex manufacturing factories, it is very important to accurately track the main causes for efficiency losses which might be due to process organization and are negatively affecting the manpower results or which might be due to asset performance and availability. Moreover, in such manufacturing environments, a manpower-caused loss can impact the efficiency of the equipment and, vice-versa, an equipment-caused loss can reduce the performance of the manpower.

Hence, MES systems are required to provide manufacturing companies with easy and reliable monitoring of manpower and assets efficiency.

In the art, the two KPIs typically used for measuring labor and equipment performances are, respectively, the overall labor effectiveness (OLE) for monitoring manpower results and overall equipment effectiveness (OEE) for monitoring asset results.

The OEE and OLE indicators measure the utilization, performance, and quality of equipment and manpower respectively, and their impact on productivity.

The OEE and OLE indicators measure availability, performance, and quality; where:

Availability is the percentage of equipment/manpower spent making effective contributions;

Performance is the amount of delivered product or tasks with respect to a given target;

Quality is the percentage of perfect or sellable realized product.

OEE and OLE allows manufacturers to make operational decisions by giving them the ability to analyze the cumulative effect of these factors on productive output.

In low-level automation processes, OEE does not provide significant information, because the major part of work consists in manual activities performed by operators.

In order to calculate OEE and OLE, it is necessary to define:

a) a time model to categorize the elapsing time in defined "working statuses" also simply called "statuses" (e.g. busy, idle, stop, etc.); and b) an interaction mode between operators and MES system to gather time model records and stamps or logs.

State of the art MES applications provide methods and systems for calculating OLE and OEE indicators. Measuring techniques for OLE and OEE indicators are quite commodities in many shop-floor practices and MES systems, even if there are several minor differences in the interpretations of details.

Below are provided, for explanatory sake, examples of formulas for calculation of OLE and OEE indicators; as the skilled in the art knows, many other variants of the below formulas can be and are actually used.

OLE Formula Example:

Availability=(Active)/(Total Presence Time)

Quality=(Good Pieces)/(Total Pieces)

Performance=(Assigned Time)/(Active)

OLE=Availability*Quality*Performance

OEE Formula Example:

Availability=(Run)/(Total)

Quality=(Good Pieces)/(Total Pieces)

Performance=(Machine Time)/Run

OEE=Availability*Quality*Performance

Unfortunately, the accuracy of the calculated OLE and OEE indicators is not guaranteed when the known techniques for calculating OLE and OEE are applied simultaneously.

In fact, there are no consolidated best practices on the relationship between OLE and OEE monitoring and computation. This is a serious drawback for complex manufactures because most of the inefficiencies and loss causes in these environments are due to and affects both manpower and machine assets at the same time. Such problem is typically managed by consultancy activities that create a customer ad-hoc solution for every project, without a proven and standardized technique which guarantees that the final result of the solution implemented solution is accurate and provides a reliable performance monitoring system.

In fact, in the art, the acquired input data for OEE and OLE calculation can have information which might be wrong, incomplete, redundant and/or conflicting.

An example is the case of a machine which is broken, the loss of efficiency, e.g. 10% loss, is reflected in both the OEE and OLE indicators but when the input data is not reliable for the combined calculation of OLE or OEE, the true efficiency loss cause is not evident.

Known solutions to improve the reliability of the calculated the OLE and OEE indicators include the below described items.

Post-acquisition data processing: obtained, for example with data purging, data completion at later time, consolidated analytics reports. This solution requires additional efforts, it is an error prone procedure and it delays the availability of results which are then corrected "a-posteriori". This solution is a serious limitation when the acquisition of the OLE and OEE indicators evaluation is managed by a MES system since a requirement is to have a great level of accuracy without the need of post-acquisition data processing. Moreover, IT solutions like the MES systems are aimed at exploiting the machines capabilities to automatically report efficiency measures and indicators.

Double-data entry, obtained for example by requiring the operators to notify performance information on behalf of the manufacturing machines or to validate the automatic acquired data. This solution requires additional time spent by operators and partially or totally disrupts the capability to acquire OEE data automatically from the machine.

Focusing on aggregate indicators only. Instead of acquiring and monitoring detailed loss causes, the OEE and OLE indicators are evaluated for high-level manufacturing statuses only (e.g. Normal Working, Problem, Idle). This simplification allows the methods to be valid also in presence of not accurate data acquisition. On the other hand there is unfortunately little value in calculating these aggregated indicators as they cannot really help in taking corrective actions.

SUMMARY OF THE INVENTION

It is therefore the aim of the present invention to overcome the above mentioned drawbacks, in particular by providing a method and a system for collecting by a MES system time-logs of working-statuses of machines and operators for the calculation of the time-dependant component of OLE and OEE indicators, where no overlapping data are collected, where no double or redundant data entry is necessary and no corrective actions are required.

The aforementioned aim is achieved by a method and a system for collecting by a MES system time-stamps of working-statuses of machines and operators for the calculation of the time-dependant component of OLE and OEE indicators in a manufacturing task, wherein an operator and a machine are assigned to a task, said operator and machine being hereinafter called actors. The method including:

a) providing an entity for assigning to an actor the responsibility of data provision, such entity herein-after called token;

b) defining two meta-statuses for a machine in a task, each meta-status groups a set of machine statuses: the first meta-status being hereinafter called an operating meta-status and the second meta-status being hereinafter called a booked meta-status; wherein the two machine meta-status are defined as follows:

a machine is defined to be in an operating meta-status when the machine is in a status engaged in the task and it is able to know and notify its own status;

a machine is defined to be in an booked meta-status when the machine is in a status engaged in the task and it is unable to notify its own status;

c) collecting, via the MES system, the time stamps of the statuses of the machine and/or of the operator in a given manufacturing task as follows:

c1) at the start of the given task, by the MES system, assigning the token to an actor;

c2) while the given task is in progress:

c21) by the MES, collecting from the actor owning the token, time stamps of statuses;

c22) if a status transition event took place and such event implies also a meta-status transition event:

(1) by the operator, notifying the MES that an event of meta-status transition took place;

(2) by the MES, assigning the token ownership to the machine if the meta-status switched from booked to operating or, alternatively, assigning the token ownership to the operator if the meta-status switched from operating to booked.

In invention embodiments, the token may conveniently be a PLC flag.

In other invention embodiments, the token may be an internal variable or a flag of the MES system.

In invention embodiments, wherein in sub-item c21) the time stamps of statuses are triggered by events of status transitions or are polled by MES.

In invention embodiments, wherein item c1) further includes creating a new logging session.

Furthermore, a computer program element can be provided, containing computer program code for performing steps according to the above mentioned method when loaded in a digital processor of a computing device.

Additionally, a computer program product stored on a computer usable medium can be provided, containing computer readable program code for causing a computing device to perform the mentioned method.

With invention embodiments, no additional efforts for data purging, completion or manipulation are necessary. The method allows to fully taking advantage of real-time and automatic indicators data acquisition from machines and it does not over-charge the operators with a lot of data inputting tasks since input data are correctly synchronized.

With invention embodiments, the collected time logs enable calculation of OLE and OEE indicators in a combined solution and clarify the responsibility of operators or machine in notifying the performance results and losses.

With invention embodiments, complex manufactures can benefit of a clear and reliable monitoring solution that enable real data investigation to discovery main loss causes and act necessary countermeasures.

Other features which are considered as characteristic for the invention are set forth in the appended claims.

Although the invention is illustrated and described herein as embodied in a method and system for collecting via a MES system time-stamps of working-statuses, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
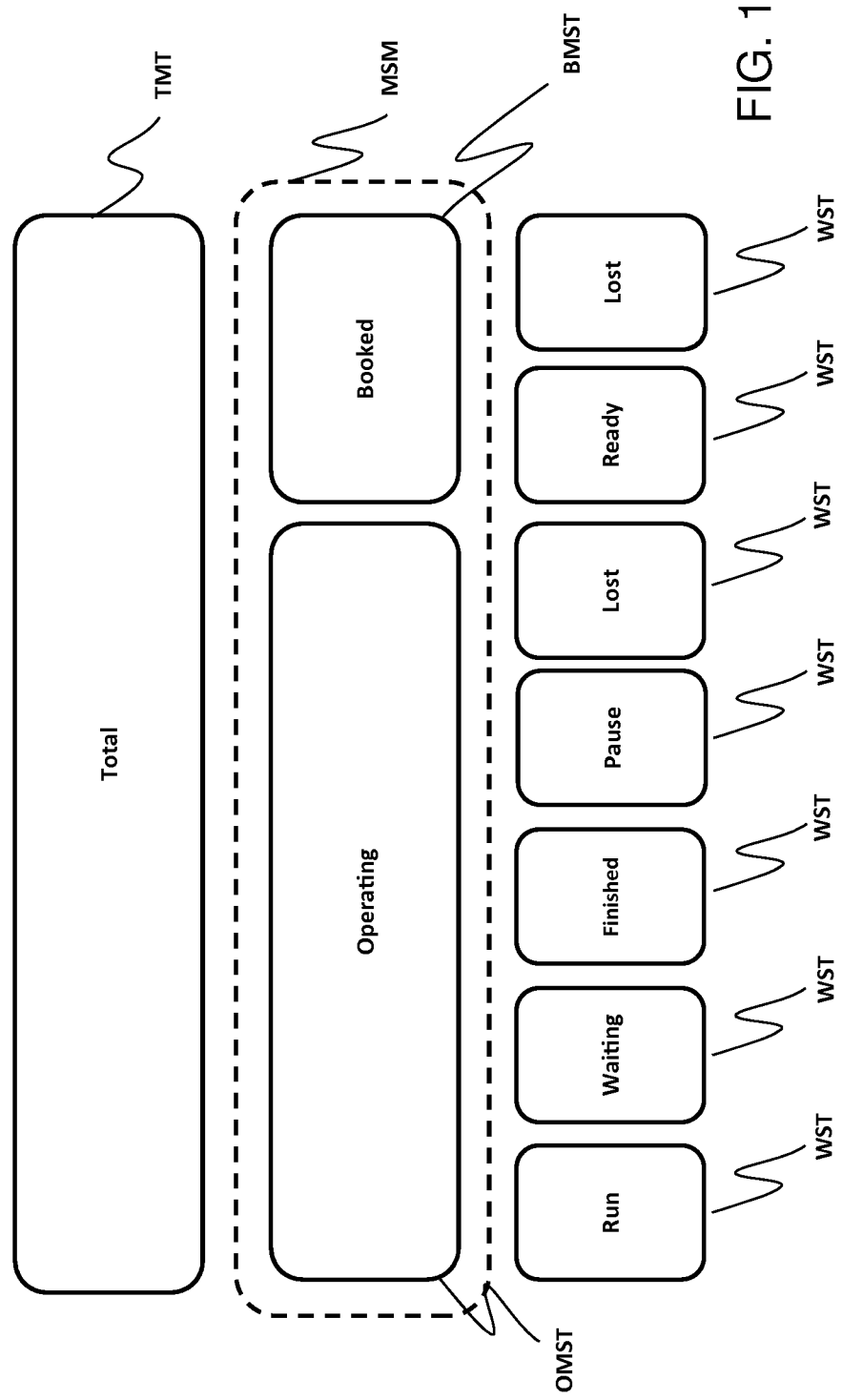
FIG. 1 is a diagram schematically representing an exemplary embodiment of meta-status model containing an operating meta-status and a booked meta-status according to the invention.

At least some embodiments of the present invention addresses the above described issue in which, in a given manufacturing task, a MES system is collecting time logs/stamps of statuses of machines and operators for the calculation of the time-dependant component of OLE and OEE indicators. In general, with the term time-dependant component it is meant the component of the indicator which is depending on the time of permanence in some predefined working statuses such as, for example, time of permanence in statuses that are of "run" type, statuses which belong to operating and/or booked meta-statuses: the time of permanence in a status may be calculated as a difference between final and initial time stamps or logs.

Examples of the time-dependent component of the above given examples of OLE and OEE indicator formulas may be given by the availability component or the performance component.

In the given manufacturing task, the machine and the operator are assigned to a task, and they are herein called actors.

In order to assign to an actor the ownership and/or responsibility of data provision, it is provided an entity called a token. In invention embodiments, the token may preferably be a programmable logic controller (PLC) flag or an internal variable or a flag of the MES.

Token ownership rules are conveniently provided with the meta-status model of the proposed invention, in which two meta-statuses are defined for a machine in a task, where each meta-status groups a set of machine statuses.

In the operating meta-status, the machine is in a status engaged in the task and it is able to know and notify its own status.

In the booked meta-status, the machine is in a status engaged in the task and it is unable to notify its own working status.

Ownership rules are now described.

A token is owned by the operator when the machine is in the booked meta-status, i.e. meaning that the process is focusing on manual operation (with or without machine involvement).

The token is owned by the machine when the machine is in the operating meta-status, i.e. meaning that the process is focusing on automatic machining operation.

The MES system collects the time stamps or logs of the statuses of the machine and/or of the operator in a given manufacturing task in order to provide input data for calculating the time component of the OEE and OLE indicators.

According to the proposed invention, the time stamp collection for OEE and OLE calculation is performed in a synchronized manner, so that advantageously:

no overlapping input data are collected;
no double or redundant input data entry is required;
no garbage data are collected, e.g. when a machine is in an idle status belonging to the booked meta-status all input data coming from machines are ignored); and
no corrective actions are required.

When the task starts, usually by an operator, the MES system assigns the token to one of the two actors. Then, while the given task is in progress, the MES collects from the actor owning the token the relevant time stamps of the working statuses of machine and operator. The MES time stamps data collection may preferably be triggered by events of status transitions or may be polled by the MES at certain time intervals.

In case there is a status transition event which imply also a meta-status transition event, the operator notifies the MES that an event of meta-status transition took place so that the MES can assign the token ownership to the relevant actor as follows: to the machine if the meta-status switched from booked to operating or, alternatively, to the operator if the meta-status switched from operating to booked.

At the start of a machine task a new logging session may advantageously be created and the collected time stamps may be saved by the MES at the end of the task, but if necessary they may be saved also during the task.

In inventive embodiments, the time stamp collection may conveniently be performed for more than one manufacturing task active in the factory, if desired also simultaneously.

The collected time stamps and logs are used by the MES system to calculate the time component for the OEE and OLE indicators.

Furthermore, a computer program element can be provided, containing computer program code for performing steps according to the above mentioned method when loaded in a digital processor of a computing device.

Additionally, a computer program product stored on a computer usable medium can be provided, containing computer readable program code for causing a computing device to perform the mentioned method.

Only the actor owning the token provides input data for OEE and OLE calculation, while the other actor without token passively inherit the OEE and OLE relevant input data from the actor owning the token.

When a machine is used for manual assisted activities, e.g. the machine is getting ready for main tasks, it is in the booked meta-status and it does not own the token. When the machine is performing the main productive tasks, it is in the operating meta-status and it owns the token.

Once the task owner is the machine, labor time counting for the operator does not stop even if the task owner is the machine. This is because we assume that the operator attends a machine that owns the task at least for a percentage of its execution time.

In fact, the OLE of the assisting operator is considered 100% or a declared allocated part-time, e.g. 50% if operator is supervising 2 machines simultaneously, considering that the super visioning activity cannot cause losses.

The machines have an automatic control system and are able to notify their status when running in operating mode.

FIG. 1 is a diagram showing an exemplary embodiment of meta-status time model containing an operating meta-status and a booked meta-status.

FIG. 1 is aimed at representing graphically the OEE machine time model with the introduction of the meta-status model MSM according to an exemplary embodiment of the present invention. The horizontal axis of the diagram of FIG. 1 represents time. In the upper part of the FIG. 1 there is a total machine time TMT and in the lower part, there are times WST spent in the machine OEE working statuses, already known in the art.

The meta-status model MSM, according to an exemplary embodiment of the present invention, is represented in the middle part of the drawing and contains the time spent by the machine in the operating meta-status OMST and the time spent by the machine in the booked meta-status BMST.

It should be noted that the introduction of the meta-status model MSM does not affect the level of accuracy of the OEE data acquisition, since the machine working statuses can be defined with the highest desired granularity, as for example: Run, Setup, Pause, Lost, Waiting etc.

The operating meta-status is grouping a set of working statuses in which the machine is engaged in the task and it is able to know and notify its own working status. A machine in an operating meta-status may either be attended or unattended. FIG. 1 shows, on the left side, some examples of working status which belong to the operating meta-status OMST such as:

Run: the machine is performing the task, e.g. progressing the given program or routines;

Waiting: the machine is waiting for an attended action (e.g. confirmation to run next section of machine programs or routines);

Finished: the machine completed the current task (e.g. last program or routine completed);

Pause: the machine is on pause (e.g. because cooling-down is necessary); and

Lost: the machine is stopped due to unexpected machine caused events (e.g. machine hydraulic failure, safety alarm, etc.).

The booked meta-status is grouping a set of working statuses in which the machine is engaged in the task (and hence not available for other tasks) and it is not able to notify its own working status. The machine may be under control of an operator for preparation, cleaning and other activities linked to the task, before and after operation. FIG. 1 shows, on the right side, some examples of working status which belong to the booked meta-status BMST such as:

Ready: machine is ready and can accept a new program/routine start signal;

Lost: machine is stopped due to unexpected process caused events (e.g. missing tool, unclear work instruction, etc.)

As one skilled in the art knows, additional or other working statuses may be defined according to the types of tasks, to the types of machines and/or to the desired customer requirements.

Figure 2:
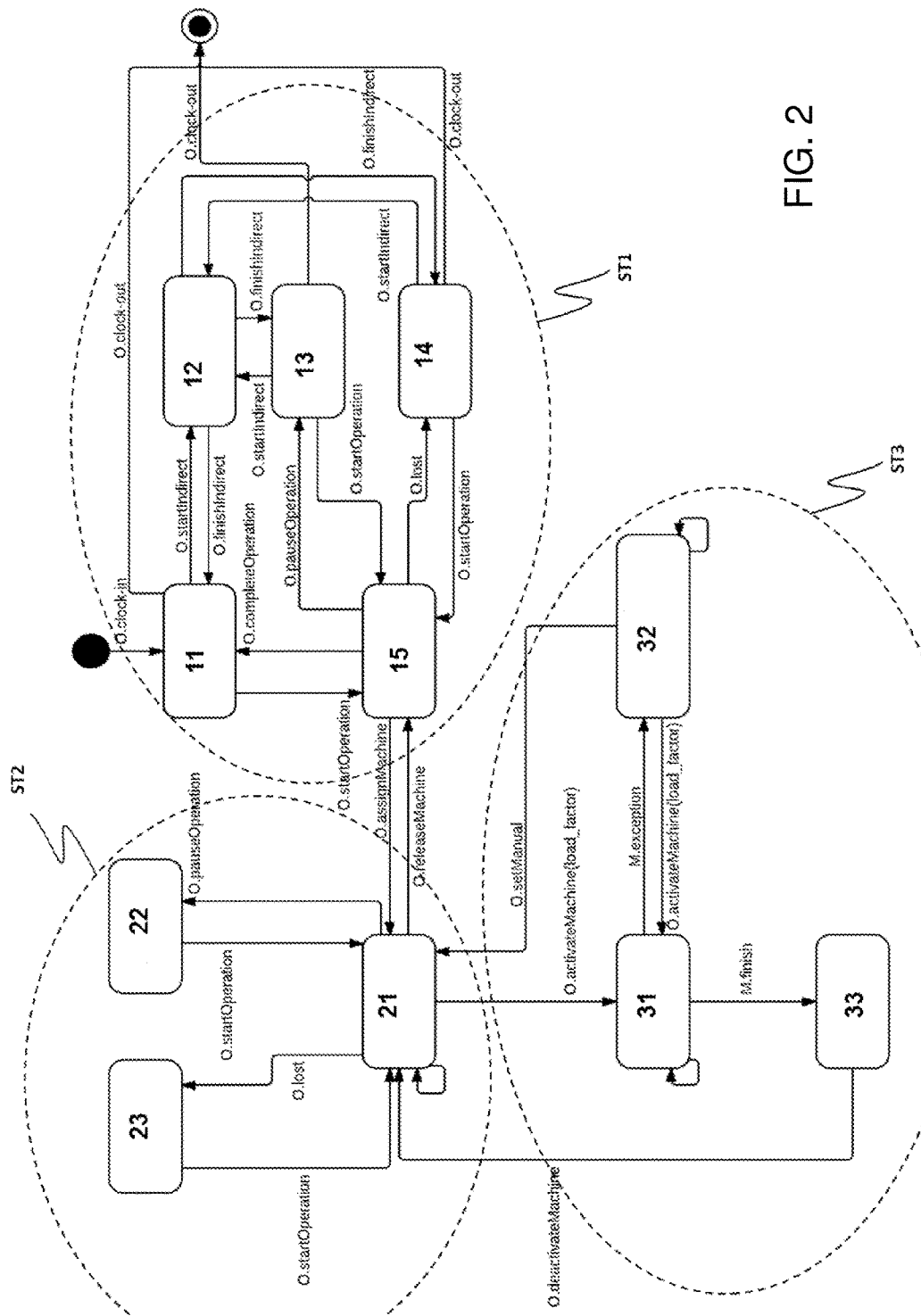
FIG. 2 is a block diagram schematically representing an exemplary embodiment of a state machine with status transitions.

FIG. 2 is a block diagram schematically representing an exemplary embodiment of a state machine with states and their transitions, starting with operator clocking in IN and finishing with operator clocking out OUT.

In the state machine of FIG. 2 each block is a working status identified by a couple including: an operator working status and a machine working status.

Machine working statuses may be grouped under the operating or booked meta-status.

Here follows a short description of each state block shown in FIG. 2.

States Highlighted by the Dashed Oval ST1:

state 11: operator in "Idle" status/machine not applicable;

state 12: operator "Active on Indirect Activities" status/machine not applicable;

state 13: operator in "Pause" status/machine not applicable;

state 14: operator in "Lost" status/machine not applicable; and state 15: operator in "Active" status/machine not applicable.

All such states ST1 are states in which the token is owned by the operator who is not using a machine. The time logs or times of permanency of such states ST1 are relevant only for the calculation of the OLE indicator.

States Highlighted by the Dashed Oval ST2:

state 21: operator in "Active" status/machine in "Ready" status (Booked meta-status);

state 22: operator in "Pause" status/machine in "Ready" status (Booked meta-status); and state 23: operator in "Lost" status/machine in "Ready" status (Booked meta-status).

All such states ST2 are states in which the token is owned by the operator who is using a machine. The time logs or times of permanency of such states ST2 may be relevant for calculation of both the OEE and OLE indicators.

States Highlighted by the Dashed Oval ST3:

state 31: operator in "Attend" status/machine in "Run" status (Operating meta-status);

state 32: operator in "Attend" status/machine in "Waiting" status (Operating meta-status); and state 33: operator in "Attend" status/machine in "Finished" status (Operating meta-status).

All such states ST3 are states in which the token is owned by the machine which is assisted by the operator. The time logs or times of permanency of such states ST3 is relevant only for calculation of the OEE indicator.

In each state, only one actor owns the token, either the operator or the machine. More in particular, in the highlighted states ST1 the token is owned by the operator, in the in the highlighted states ST2 the token is owned by the operator being the machine in statuses which are booked meta-status, in the highlighted states ST3 the token is owned by the machine being the machine in statuses which are operating meta-status.

The arrow represents the switching from one state to another state and they are called transitions. The event that causes the transition is called the triggering event. For each state, only the token owner can trigger the event. In each transition it indicated which is the triggering actor, e.g.

transitions indicated as "O.<transition name>" are triggered by the operator and transitions indicated as "M.<transition name>" are triggered by the machine.

Every output transitions from one state where the machine is in operating meta-status is triggered by the same actor; e.g. in state 31 both output transitions, "M.exception" and "M.finish", are triggered by the machine.

The transition allowing the operator to move from state 32 to operator attending may advantageously allow specifying the load factor that is the percentage of machine work that needs to be attended by operator, e.g. with the transition "O.activateMachine(load_factor). According to the shown state diagram, once the operator is in attend state 31 he cannot move into pause state 22 or lost state 23.

In invention embodiments, state blocks containing <<subs>>, e.g. state blocks 14,21,23,31,32 may advantageously be detailed and refined with additional information about sub-status or reasons, according to customer needs and the level of precision required in classifying collected time. For example, for the state 14 having for the couple of status "Lost/n.a" the additional information may be the following: <<subs>>={Missing Tool/n.a., Missing Material/n.a, Machine not Available/n.a . . . }. Advantageously, with such embodiments, data accuracy at desired level may be acquired.

In invention embodiments, state blocks containing a self-loop, e.g. state blocks 21,31, may conveniently be repeated depending on the required level of details. e.g. for the couple Attend/Operating, <<subs>>={Attend/Setup, Attend/Run, . . . }.

The invention claimed is:

1. A method of collecting via a manufacturing execution system (MES) time-stamps of working statuses of machines and operators for a calculation of a time-dependant component of overall labor effectiveness (OLE) and overall equipment effectiveness (OEE) indicators in a manufacturing task, wherein an operator and a machine are assigned to a task, the operator and the machine being hereinafter called actors, which method comprises performing the following steps with a processor:
   a) assigning to an actor, an entity, defining responsibility of data provision, the entity herein-after being called a token;
   b) defining two meta-statuses for the machine in the task, each of the meta-statuses grouping a set of machine statuses: the meta-statuses including a first meta-status hereinafter called an operating meta-status and a second meta-status hereinafter called a booked meta-status, wherein the two meta-status being defined as follows:
      the machine is defined to be in the operating meta-status when the machine is in a status engaged in the task and the machine is able to know and notify its own status;
      the machine is defined to be in the booked meta-status when the machine is in a status engaged in the task and the machine is unable to notify its own status;
   c) collecting, via the MES system, the time stamps of the statuses of the machine and/or of the operator in a given manufacturing task, which collecting step further includes the steps of:
      c1) assigning the token to the actor at a start of the given manufacturing task via the MES system;
      c2) during the given manufacturing task being in progress,
         c21) collecting from the actor owning the token, the time stamps of the statuses via the MES system;
         c22) if a status transition event took place and such event implies also a meta-status transition event:
            notifying the MES system that an event of meta-status transition took place via the operator;
            assigning the token ownership to the machine upon determining that the meta-status switched from the booked meta-status to the operating meta-status via the MES system, or assigning the token ownership to the operator upon determining that the meta-status switched from the operating meta-status to the booked meta-status.

2. The method according to claim 1, wherein the token is a programmable logic controller flag.

3. The method according to claim 1, wherein the token is an internal variable or a flag of the MES system.

4. The method according to claim 1, wherein in sub-step c21) the time stamps of the statuses are triggered by events of status transitions or are polled by the MES system.

5. The method according to claim 1, wherein in step c1) creating a new logging session.

6. The method according to claim 1, which further comprises implementing the method via software.

7. A system for collecting via a manufacturing execution system (MES) time-stamps of working statuses of machines and operators for a calculation of a time-dependant component of overall labor effectiveness (OLE) and overall equipment effectiveness (OEE) indicators in a manufacturing task, wherein an operator and a machine are assigned to a task, the operator and the machine being hereinafter called actors, the system comprising:
   a) means for assigning an entity to the actor for defining responsibility of data provision, the entity herein-after called a token;
   b) means for defining two meta-statuses for the machine in the task, each of the meta-statuses grouping a set of machine statuses, the meta-statuses including a first meta-status hereinafter called an operating meta-status and a second meta-status hereinafter called a booked meta-status, the two machine meta-status are defined as follows:
      the machine is defined to be in the operating meta-status when the machine is in a status engaged in the task and the machine is able to know and notify its own status;
      the machine is defined to be in the booked meta-status when the machine is in a status engaged in the task and the machine is unable to notify its own status;
   c) means for collecting via the MES system the time stamps of the statuses of the machine and/or of the operator in a given manufacturing task as follows:
      c1) at a start of the given manufacturing task, means for assigning via the MES system the token to the actor;
      c2) while the given manufacturing task is in progress:
         c21) means for collecting, by the MES system, from the actor owning the token, the time stamps of the statuses;
         c22) if a status transition event took place and the status transition event implies also a meta-status transition event:
            means for notifying, by the operator, to the MES system that an event of meta-status transition took place;
            means for assigning, by the MES system, a token ownership to the machine upon determining that the meta-status switched from the booked meta-status to the operating meta-status or, alternatively, means for assigning, by the MES system, the token ownership to the operator upon determining that the meta-status switched from the operating meta-status to the booked meta-status.

* * * * *